US012535757B2

(12) United States Patent
Muramatsu et al.

(10) Patent No.: US 12,535,757 B2
(45) Date of Patent: Jan. 27, 2026

(54) FIXING APPARATUS AND ELECTROPHOTOGRAPHIC IMAGE FORMING APPARATUS

(71) Applicant: CANON KABUSHIKI KAISHA, Tokyo (JP)

(72) Inventors: Hiroki Muramatsu, Tokyo (JP); Tomoyo Miyakai, Tokyo (JP); Ryunosuke Kawahara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/748,477

(22) Filed: Jun. 20, 2024

(65) Prior Publication Data

US 2025/0004406 A1 Jan. 2, 2025

(30) Foreign Application Priority Data

Jun. 27, 2023 (JP) ................................ 2023-104714

(51) Int. Cl.
*G03G 15/20* (2006.01)

(52) U.S. Cl.
CPC ....... *G03G 15/206* (2013.01); *G03G 15/2025* (2013.01); *G03G 15/2064* (2013.01); *G03G 2215/2048* (2013.01)

(58) Field of Classification Search
None
See application file for complete search history.

(56) References Cited

U.S. PATENT DOCUMENTS

| | | | |
|---|---|---|---|
| 5,083,168 A | 1/1992 | Kusaka et al. |
| 5,149,941 A | 9/1992 | Hirabayashi et al. |
| 5,162,634 A | 11/1992 | Kusaka et al. |
| 5,262,834 A | 11/1993 | Kusaka et al. |
| 5,300,997 A | 4/1994 | Hirabayashi et al. |

(Continued)

FOREIGN PATENT DOCUMENTS

| | | |
|---|---|---|
| CN | 102770814 A | 11/2012 |
| CN | 115702394 A | 2/2023 |

(Continued)

OTHER PUBLICATIONS

Molykote® HP-300 Grease, Dow Corning (2025).*

(Continued)

*Primary Examiner* — Sevan A Aydin
(74) *Attorney, Agent, or Firm* — Venable LLP

(57) ABSTRACT

A fixing apparatus comprising: a fixing film having an endless shape, a pressurizing member disposed to face the fixing film and configured to form a nip with the fixing film, and a heating member disposed inside of the fixing film, having a facing surface facing an inner circumferential surface of the fixing film, and configured to bias the fixing film against the pressurizing member, and a fluorine grease interposed between the inner circumferential surface and the facing surface, wherein the fixing film has at least a base layer, an elastic layer, and a surface layer in this order, the surface layer comprises a PFA, the surface layer comprises a plurality of spherulites of the PFA, and in an endothermic curve measured with a specific condition by a DSC, using a sample sampled from the surface layer, an endothermic quantity in a temperature rising process is 21 J/g or more.

5 Claims, 2 Drawing Sheets

(56) References Cited

U.S. PATENT DOCUMENTS

| | | | | |
|---|---|---|---|---|
| 5,343,280 | A | 8/1994 | Hirabayashi et al. | |
| 5,486,442 | A * | 1/1996 | Takimoto | C08G 69/40 349/114 |
| 5,697,037 | A | 12/1997 | Yano et al. | |
| 5,767,484 | A | 6/1998 | Hirabayashi et al. | |
| 7,682,542 | B2 | 3/2010 | Chen et al. | |
| 8,086,160 | B2 | 12/2011 | Nishizawa et al. | |
| 8,263,702 | B2 | 9/2012 | Zhang et al. | |
| 8,787,810 | B2 | 7/2014 | Sakakibara et al. | |
| 11,966,181 | B2 | 4/2024 | Nemoto et al. | |
| 2002/0025184 | A1 * | 2/2002 | Ishikawa | G03G 5/0696 430/46.4 |
| 2009/0092426 | A1 | 4/2009 | Nishizawa et al. | |
| 2011/0249995 | A1 * | 10/2011 | Uchida | G03G 15/162 399/308 |
| 2012/0014726 | A1 * | 1/2012 | Sekihara | G03G 15/206 399/333 |
| 2012/0195654 | A1 | 8/2012 | Sakakibara et al. | |
| 2012/0309602 | A1 | 12/2012 | Nakajima et al. | |
| 2013/0260299 | A1 * | 10/2013 | Nakajima | G03G 15/2064 399/329 |
| 2015/0241825 | A1 * | 8/2015 | Miura | G03G 15/2057 399/333 |
| 2015/0378272 | A1 | 12/2015 | Hase et al. | |
| 2017/0097597 | A1 * | 4/2017 | Maeda | G03G 15/2057 |
| 2022/0206419 | A1 * | 6/2022 | Muramatsu | B32B 1/08 |

FOREIGN PATENT DOCUMENTS

| | | | | |
|---|---|---|---|---|
| EP | 3 153 931 | A2 | 4/2017 | |
| EP | 4020091 | A1 * | 6/2022 | G03G 15/2017 |
| JP | 63-313182 | A | 12/1988 | |
| JP | 2-157878 | A | 6/1990 | |
| JP | 8-220907 | A | 8/1996 | |
| JP | 2000-10430 | A | 1/2000 | |
| JP | 2003-76190 | A | 3/2003 | |
| JP | 2005-84225 | A | 3/2005 | |
| JP | 2007-93650 | A | 4/2007 | |
| JP | 2007-187889 | A | 7/2007 | |
| JP | 2007-322751 | A | 12/2007 | |
| JP | 2009-25612 | A | 2/2009 | |
| JP | 2013105080 | A | 5/2013 | |

OTHER PUBLICATIONS

Molykote® HP-300 Grease, DuPont (2025).*

Netzsch: "PFA: Perfluoroalkoxy," Retrieved from the Internet: URL:https://analyzing-testing.netzsch.com/en/polymers-netzsch-com/hig••temperature-resistant-thermoplastics/pfa-perfluoroalkoxy Dec. 2024 (XP002812782).

Extended European Search Report in European Application No. 24184208.7 (Jan. 2025).

* cited by examiner

FIXING APPARATUS AND ELECTROPHOTOGRAPHIC IMAGE FORMING APPARATUS

BACKGROUND OF THE INVENTION

Field of the Invention

The present disclosure relates to a fixing apparatus and an electrophotographic image forming apparatus.

Description of the Related Art

As fixing members used for heating and fixing apparatuses of electrophotographic image forming apparatuses, such as printers, copiers, and facsimiles, there are film-shaped or roller-shaped fixing members. As these fixing members, fixing members in which elastic layers made of a heat-resistant rubber or the like are optionally formed on a film- or roller-shaped substrate made of a heat-resistant resin or a metal, and the surface layer of the fixing member contains a fluororesin with excellent releasability for toners have been known. Here, as fluororesins to be included in the surface layer, a tetrafluoroethylene-perfluoroalkyl vinyl ether copolymer (PFA), which is excellent in heat resistance, is preferably used.

Incidentally, from the viewpoint of energy conservation promotion, film heating-type fixing apparatuses that perform heating via a fixing film with a small heat capacity, that is, film-fixing apparatuses, have recently been proposed as on-demand-type fixing apparatuses with high heat transfer efficiency and quick apparatus start-up. Japanese Patent Application Publication No. S63-313182 and Japanese Patent Application Publication No. H02-157878 disclose film fixing apparatuses including, for example, a ceramic heater (hereinafter referred to as a "heater") as a fixed and supported heating body, for example, a heat-resistant resin film (hereinafter referred to as a "fixing film") as a heat-transfer member sliding with the heater, and an elastic pressurizing roller as a pressure member that comes into pressure contact with the heater via the fixing film to form a fixing nip portion as a toner image-heating and fixing area, wherein a recording material carrying an unfixed toner image is nipped and transported between the fixing film and the pressurizing roller in the fixing nip portion to heat and melt the unfixed toner image by the heat from the heater via the fixing film and fix the unfixed toner image on the recording material.

Incidentally, in the fixing apparatus, as disclosed in Japanese Patent Application Publication No. 2007-187889 and Japanese Patent Application Publication No. 2005-84225, in order to ensure slidability between a fixing film and a member disposed in the fixing film so as to be in contact with the inner circumferential surface of the fixing film, a lubricant including fluorinated oil may be interposed between the fixing film and the member.

SUMMARY OF THE INVENTION

However, according to the study of the present inventors, a lubricant comprising fluorinated oil may be adhered on a surface layer of the fixing film provided with the surface layer that comprises a fluororesin, such as PFAs, when the fixing apparatus is in operation. At this time, cracks may occur on the surface layer along the direction orthogonal to the circumferential direction of the fixing film. In the surface layer comprising a fluororesin, a fluororesin tube formed by extruding a fluororesin in a cylindrical shape is often used.

In such a fluororesin tube, a fluororesin is crystallized by molecules of the fluororesin oriented in the direction orthogonal to the circumferential direction. The present inventors have considered that fluorinated oil enters the intermolecular space of fluororesins oriented in the direction orthogonal to the circumferential direction and loosens the bonds between molecules of fluororesins to cause cracks. Hereinafter, tears on the surface layer at the point where fluorinated oil adheres are also referred to as a "chemical crack".

Meanwhile, the present inventors have found that the occurrence of chemical cracks is suppressed on the surface layer formed by melting the fluororesin particles adhered to the elastic layer or on the surface where a fluororesin tube is heated to a temperature not lower than the melting point of a fluororesin on the surface layer to relax the orientation of the fluororesin. However, the surface layer obtained by these methods has room for improvement in wear resistance, although the occurrence of chemical attacks can be suppressed.

At least one aspect of the present disclosure directs to the provision of a fixing apparatus that contributes to the formation of high-quality electrophotographic images over a long period of time. At least one aspect of the present disclosure directs to the provision of an electrophotographic image forming apparatus that can form high-quality electrophotographic images over a long period of time.

At least one aspect of the present disclosure provides a fixing apparatus comprising:

- a fixing film having an endless shape,
- a pressurizing member disposed to face the fixing film and configured to form a nip with the fixing film, and
- a heating member disposed inside of the fixing film, having a facing surface facing an inner circumferential surface of the fixing film, and configured to bias the fixing film against the pressurizing member, and
- a fluorine grease interposed between the inner circumferential surface and the facing surface, wherein
- the fixing film has at least a base layer, an elastic layer, and a surface layer in this order,
- the surface layer comprises a tetrafluoroethylene-perfluoroalkyl vinyl ether copolymer (PFA),
- the surface layer comprises a plurality of spherulites of the PFA, and
- in an endothermic curve measured at a ramp rate of 20° C./min by a differential scanning calorimeter (DSC), using a sample sampled from the surface layer as a measurement sample, an endothermic quantity in a temperature rising process is 21 J/g or more.

According to at least one aspect of the present disclosure, a fixing apparatus that contributes to the formation of high-quality electrophotographic images over a long period of time can be obtained. At least one aspect of the present disclosure can provide an electrophotographic image forming apparatus that can form high-quality electrophotographic images over a long period of time. Further features of the present invention will become apparent from the following description of exemplary embodiments with reference to the attached drawings.

DESCRIPTION OF THE EMBODIMENTS

In the present specification, the term "from XX to YY" or "XX to YY" indicative of the numerical value range means the numerical value range including the lower limit and the upper limit, i.e., the endpoints unless otherwise specified. Further, when the numerical value range is described in steps, the upper limits and the lower limits of respective numerical value ranges can be arbitrarily combined. Below, the embodiments of the present disclosure will be described in detail. Incidentally, the technical scope of the present disclosure is not limited to the following description.

Construction

A fixing apparatus comprising:

a fixing film having an endless shape, a pressurizing member disposed to face the fixing film and configured to form a nip with the fixing film, and a heating member disposed inside of the fixing film, having a facing surface facing an inner circumferential surface of the fixing film, and configured to bias the fixing film against the pressurizing member, and a fluorine grease interposed between the inner circumferential surface and the facing surface, wherein the fixing film has at least a base layer, an elastic layer, and a surface layer in this order, the surface layer comprises a tetrafluoroethylene-perfluoroalkyl vinyl ether copolymer (PFA), the surface layer comprises a plurality of spherulites of the PFA, and in an endothermic curve measured at a ramp rate of 20° C./min by a differential scanning calorimeter (DSC), using a sample sampled from the surface layer as a measurement sample, an endothermic quantity in a temperature rising process is 21 J/g or more.

Electrophotographic Image Forming Apparatus

Figure 1:
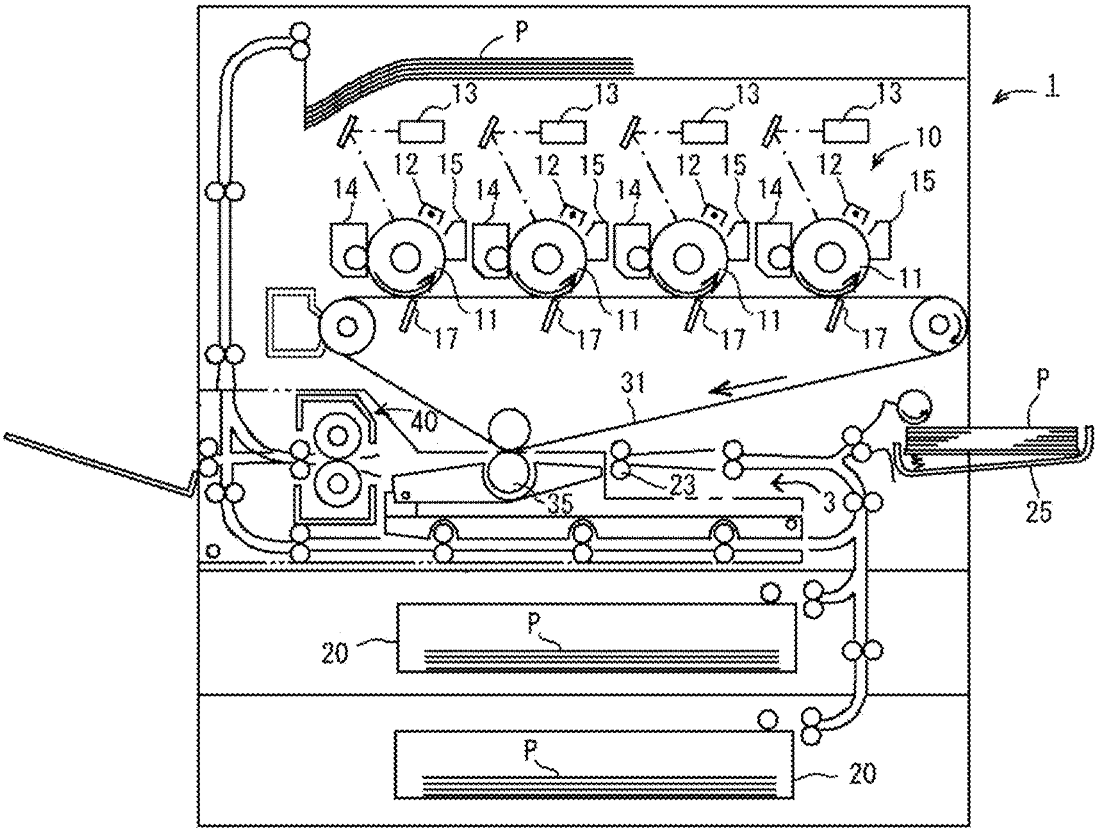
FIG. 1 is a schematic diagram of the image forming apparatus according to one aspect of the present disclosure.

FIG. 1 is a sectional view of a color electrophotographic image printer, which is an example of an electrophotographic image forming apparatus (hereinafter referred to as an "image forming apparatus") of the present embodiment and is a sectional view along the conveying direction of sheets. In the present embodiment, a color electrophotographic image printer is simply called a "printer".

The printer 1 illustrated in FIG. 1 is provided with an image forming unit 10 for yellow (Y), magenta (M), cyan (C), and black (Bk) colors. A photosensitive drum 11 is charged in advance by a charging device 12. After that, a latent image is formed on the photosensitive drum 11 by a laser scanner 13. The latent image is converted into a toner image by a developing device 14. The toner image on the photosensitive drum 11 is sequentially transferred to an image bearing member, such as an intermediate transfer film 31, by a primary transfer blade 17. After the transfer, the toner remaining on the photosensitive drum 11 is removed by a cleaner 15. As a result, the surface of the photosensitive drum 11 is cleaned and is ready for the next image formation.

Meanwhile, a recording material P is sent from a paper supply cassette 20 or a multi-paper tray 25 to the direction of the arrow 3 one by one and then sent to a resist roller pair 23. The resist roller pair 23 once receives the recording material P and straightens the recording material P if the recording material is skewed. Then, the resist roller pair 23 synchronizes with the toner image on an intermediate transfer film 31 and sends the recording material P between the intermediate transfer film 31 and a secondary transfer roller 35. The color toner image on the intermediate transfer film is transferred to the recording material P by a transfer body, such as the secondary transfer roller 35. After that, the toner image on the recording material is fixed to the recording material when a fixing apparatus 40 pressurizes and heats the recording material P.

Figure 2:
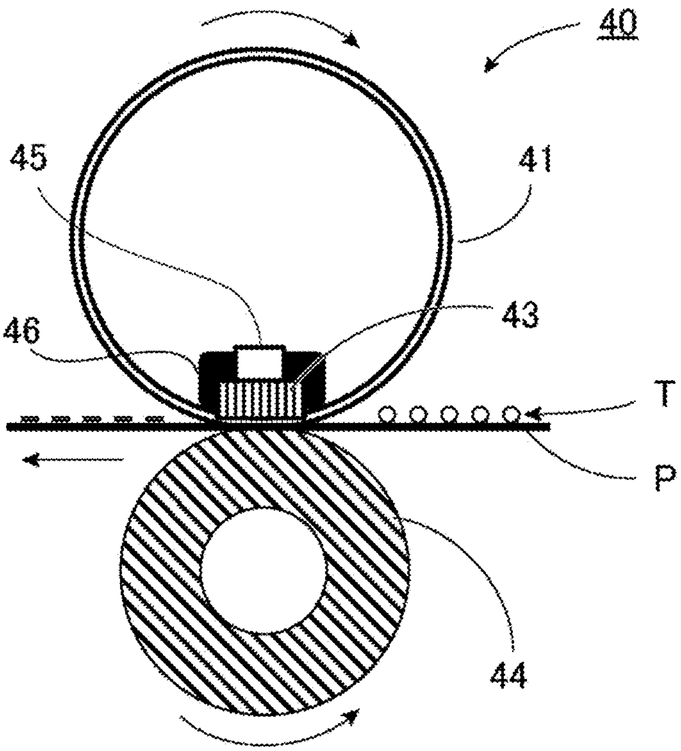
FIG. 2 is a schematic diagram of the fixing apparatus according to one aspect of the present disclosure.

The electrophotographic image forming apparatus comprises a fixing apparatus 40. Next, the fixing apparatus in the electrophotographic image forming apparatus is explained. FIG. 2 is a schematic configuration diagram of the fixing apparatus 40 and illustrates an example of a film-heating type heating device (tensionless type).

The fixing apparatus has a fixing film having an endless shape, a pressurizing member disposed to face the fixing film and configured to form a nip with the fixing film, and a heating member disposed inside of the fixing film, having a facing surface that faces the inner circumferential surface of the fixing film, and configured to bias the fixing film against the pressurizing member.

The numeral 43 represents a ceramic heater (hereinafter referred to as a "heater") as a heating body. The heater 43 has a basic configuration including an elongated thin plate-shaped ceramic substrate with the vertical direction of the drawing as the longitudinal direction and a heat-generating resistive element layer that generates heat by energization provided on the surface of the substrate. The heater 43 is a low thermal capacity heater that raises the temperature thereof with a steep rise characteristic as a whole by energizing the heat-generating resistive layer. Furthermore, the heater 43 has a configuration that switches the energized areas according to the size of the longitudinal width of the recording material.

Figure 3:
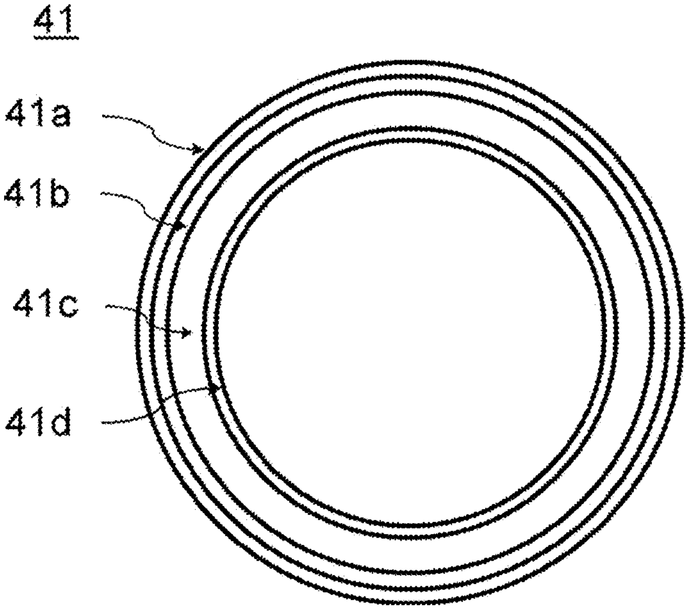
FIG. 3 is a schematic diagram of the fixing film according to one aspect of the present disclosure.

The fixing film 41 is a cylindrical (endless) heat-resistant fixing member as a heating member that transmits heat and is loosely fitted over a supporting member including the heater 43 mentioned above. The fixing film 41 is as illustrated in FIG. 3 and is a fixing film having at least a three-layer composite structure of a surface layer **41*a*, an elastic layer 41*c*, and a base layer 41*d***.

The pressurizing roller 44 is a heat-resistant elastic pressurizing roller as a pressurizing member and has a core metal and an elastic layer composed of a heat-resistant rubber, such as a silicone rubber or a fluorocarbon rubber, or a foam of silicone rubber. Both edges of the core metal are disposed to be rotatably supported by bearings. That is, the pressurizing member is preferably a pressurizing roller.

On the upper side of this pressurizing roller 44, the fixing film 41 and the heater 43 mentioned above are disposed in parallel to the pressurizing roller 44 on the heater 43 side, and are pressed by an unshown pressing member. That is, the pressurizing roller is disposed to face the fixing film. The heating member is disposed inside of the fixing film, has a facing surface (hereinafter also simply referred to as a "facing surface") that faces the inner circumferential surface of the fixing film, and is configured to bias the fixing film against the pressurizing member. By doing so, the lower surface of the heater 43 and the upper surface of the pressurizing roller 44 are brought into pressure contact with each other against the elasticity of the roller elastic layer via the fixing film 41, and a fixing nip portion with a predetermined width as a heating unit can be formed.

For example, the pressurizing member is driven by driving means (not shown). By driving the pressurizing member, a driven driving state, in which the fixing film is driven by the pressurizing member and driving, is established.

For example, the pressurizing roller 44 is rotationally driven by unshown driving means at a predetermined rotational circumferential speed in the counterclockwise direction indicated by the allow. A rotational force acts on the cylindrical fixing film 41 by the pressure contact frictional force at the fixing nip portion between the pressurizing roller 44 and the fixing film 41 due to the rotational driving of the pressurizing roller 44. Then, the fixing film 41 is in a driven rotation state in the clockwise direction indicated by the arrow while the fixing film 41 slides in close contact with the downward-facing surface of the heater 43. The supporting member 46 is also a rotation guide member of cylindrical fixing film 41.

As such, the fixing film 41 slides in contact with the heater 43. At this time, in order to ensure the slidability between the fixing film 41 and the heater 43, the fixing apparatus comprises a fluorine grease (not shown) on the surface of the heater. That is, fluorine grease is interposed between the inner circumferential surface of the fixing film and the facing surface. In the fixing apparatus, it can also be said that a fluorine grease is interposed between the heating body 43 and the fixing film. A fluorine grease serves as a lubricant. The use of a fluorine grease makes it possible to maintain lubricity over a long period of time, even under conditions of contact with a heater heated to a high temperature.

The fluorine grease is not particularly limited, and a known fluorine grease may be used. Examples of fluorine greases may include those comprising a fluororesin particle and a fluorinated oil. A fluororesin included in the fluorine grease has the function of increasing fluorinated oil retention in the grease due to the swelling of fluorinated oil. Examples of fluorinated oil may include PFPE, HFE, and the like. Examples of fluororesins may include PTFE, PFA, FEP, and the like.

As commercially available products, for example, MOLYKOTE HP-300 grease (manufactured by DuPont de Nemours, Inc.) may be used.

The pressurizing roller 44 is rotationally driven, and accordingly, the cylindrical fixing film 41 is brought into a driven rotation state. Furthermore, the heater 43 is energized, and the temperature of the heater is rapidly raised to the predetermined temperature, thereby becoming a state where the temperature is adjusted. In such a state, a recording material P carrying an unfixed toner image T is introduced between the fixing film 41 and the pressurizing roller 44 of the fixing nip portion. Then, at the fixing nip portion, the surface of the recording material P on the toner image-carrying side comes into close contact with the external surface of the fixing film 41, and the recording material P is nipped and transported by the fixing nip portion together with the fixing film 41. The recording material P is heated by the heat of the fixing film 41 that has been heated by the heater 43 in the nipping and transporting process, and the unfixed toner image T on the recording material P is heated, pressurized, molted, and fixed on the recording material P. The recording material P that has passed through the fixing nip portion is discharged and transported after curvature separation from the surface of the fixing film 41.

The numeral 45 represents a contact thermometer (thermistor) and has a configuration that measures the temperature of the fixing film 41 heated by the heater 43 and sends the detected results to unshown temperature control means. The numeral 46 represents a heater holder, which is a member that holds the heater 43 heated to a high temperature.

Next, a fixing film constituting a part of the fixing apparatus of the present disclosure will be explained in detail.

The fixing film according to one embodiment of the present disclosure has at least a base layer, an elastic layer, and a surface layer in this order. That is, the fixing film has a base layer, an elastic layer on the base layer, and a surface layer on the elastic layer. Other layers may optionally be formed between layers of the base layer, the elastic layer, and the surface layer, and on the inner circumferential surface side of the base layer and the outer circumferential surface side of the surface layer. The fixing film may have an endless shape.

For example, the fixing film 41 may have a constitution illustrated in FIG. 3. For example, in FIG. 3, the fixing film has a base layer 41*d*, an elastic layer 41*c* that covers the outer surface of the base layer 41*d*, and a surface layer 41*a* that covers the surface opposite to the side of the elastic layer facing the base layer. The surface layer 41*a* may have a resin layer 41*b* which is an adhesive layer on the surface on the opposite side to the side of the elastic layer 41*c* facing the base layer.

Hereinafter, each layer is specifically described.

(1) Base Layer

The material of the base layer 41*d* is not particularly limited, and known materials used as base layers may be employed. For example, metals such as aluminum, iron, stainless steel (SUS), and nickel, alloys, and heat-resistant resins such as polyimide may be used. The material is preferably stainless steel. The thickness of the base layer 41*d* is not particularly limited and, for example, it is preferably from 20 μm to 100 μm and more preferably from 20 μm to 50 μm from the viewpoint of strength, flexibility, and heat capacity.

The outer surface of the base layer 41*d* may be treated to impart the adhesion properties with the elastic layer 41*c*. For surface treatment, physical treatments such as blast treatments, lapping treatments, or polishing, and chemical treatments such as oxidation treatments, coupling agent treatments, or primer treatments may be used singly or in combination with multiple types of these treatments.

If the elastic layer 41*c* comprising a silicone rubber is formed on the surface of the base layer 41*d*, primer treatment is preferably performed on the surface of the base layer 41*d* in order to increase adhesion between the base layer 41*d* and the elastic layer 41*c*. Examples of primers used in the primer treatment may include paints containing, in an organic solvent, silane coupling agents, silicone polymers, hydrogenated methylsiloxane, alkoxysilanes, reaction-promoting catalysts, colorants, such as Bengala, which are blended and dispersed as appropriate.

The primer may be selected, as appropriate, depending on the material of the base layer 41*d*, the type of the elastic layer 41*c*, or the mode of crosslinking reaction. In particular, if the elastic layer 41*c* contains a large amount of unsaturated aliphatic groups, a primer containing a hydrosilyl group is preferably used in order to impart adhesion properties by the reaction with an unsaturated aliphatic group. If the elastic layer 41*c* contains a large amount of hydrosilyl groups, a primer containing an unsaturated aliphatic group is preferably used.

Other primers may include those containing alkoxy groups. Commercially available primers may be used as the primer. Furthermore, primer treatment includes a step for applying this primer to the outer surface of the base layer 41*d* (adhesive surface with the elastic layer 41*c*) and drying or baking the primer.

(2) Elastic Layer

The material of the elastic layer 41*c* is not particularly limited, and known materials used as elastic layers of fixing films may be employed. The elastic layer 41_c_ preferably comprises a silicone rubber with excellent heat resistance. As the raw material of the silicone rubber, an addition-curable liquid silicone rubber is preferably used. For example, the elastic layer 41_c_ can be formed by coating an addition-curable liquid silicone rubber on the outer surface of the base layer 41_d_ and curing the liquid silicone rubber under heating. The way of coating is not particularly limited, and any known method can be employed.

The thickness of the elastic layer 41_c_ can be designed, as appropriate, taking the surface hardness of the fixing film and the width of the fixing nip portion to be formed into consideration. The thickness of the elastic layer is preferably from 100 μm to 1000 μm and more preferably from 150 μm to 350 μm.

By keeping the thickness of the elastic layer within this range, sufficient width of the fixing nip portion can be secured when the fixing film is incorporated into the fixing apparatus.

As the silicone rubber, for example, a cured product of an addition curable liquid silicone rubber mixture described later can be used. The elastic layer 41_c_ can be formed by coating/heating a liquid silicone rubber mixture with a known method.

A liquid silicone rubber mixture usually contains the following components (a) to (d):

Component (a): an organopolysiloxane having an unsaturated aliphatic group;

Component (b): an organopolysiloxane having active hydrogen bonded with silicon;

Component (c): a catalyst;

Component (d): a thermally conductive filler

Each component will be described below.

Component (a)

An organopolysiloxane having an unsaturated aliphatic group is an organopolysiloxane having an unsaturated aliphatic group such as a vinyl group, and examples thereof include those represented by the following formulas (1) and (2). The organopolysiloxane having an unsaturated aliphatic group is preferably linear.

(1)

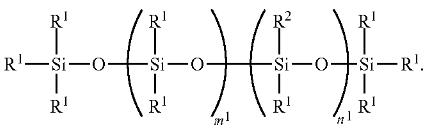

In formula (1), $m^1$ represents an integer of 0 or more, and $n^1$ represents an integer of 3 or more. Further, in structural formula (1), each $R^1$ independently represents a monovalent unsubstituted or substituted hydrocarbon group containing no unsaturated aliphatic group, provided that at least one of $R^1$ represents a methyl group and each $R^2$ independently represents an unsaturated aliphatic group.

(2)

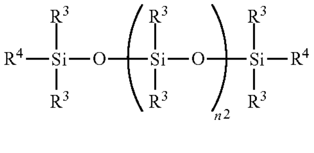

In formula (2), $n^2$ represents a positive integer, and each $R^3$ independently represents a monovalent unsubstituted or substituted hydrocarbon group containing no unsaturated aliphatic group, provided that at least one of $R^3$ represents a methyl group, and each $R^4$ independently represents an unsaturated aliphatic group.

In formulas (1) and (2), examples of the monovalent unsubstituted or substituted hydrocarbon group containing no unsaturated aliphatic group, which can be represented by $R^1$ and $R^3$, include the following groups.

—Unsubstituted Hydrocarbon Group

Alkyl group (for example, methyl group, ethyl group, propyl group, butyl group, pentyl group, and hexyl group).

Aryl group (for example, phenyl group).

—Substituted Hydrocarbon Group

Substituted alkyl group (for example, chloromethyl group, 3-chloropropyl group, 3,3,3-trifluoropropyl group, 3-cyanopropyl group, and 3-methoxypropyl group).

The organopolysiloxanes represented by formulas (1) and (2) have at least one methyl group directly bonded to the silicon atom forming the chain structure. However, 50% or more of each of $R^1$ and $R^3$ are preferably methyl groups, and more preferably all $R^1$ and $R^3$ are methyl groups, for ease of synthesis and handling.

Also, examples of unsaturated aliphatic groups that can be represented by $R^2$ and $R^4$ in formulas (1) and (2) include the following groups. Examples of unsaturated aliphatic groups include a vinyl group, an allyl group, a 3-butenyl group, a 4-pentenyl group, and a 5-hexenyl group. Among these groups, both $R^2$ and $R^4$ are preferably vinyl groups because synthesis and handling are facilitated, cost is reduced, and a cross-linking reaction can be easily performed.

From the standpoint of moldability, the component (a) preferably has a viscosity of from 1000 $mm^2/s$ to 50000 $mm^2/s$. Where the viscosity is less than 1000 $mm^2/s$, it will be difficult to adjust the hardness to the level required for the elastic layer 20_c_, and where the viscosity is more than 50000 $mm^2/s$, the viscosity of the mixture will be too high, making coating difficult. Viscosity (kinetic viscosity) can be measured using a capillary viscometer, a rotational viscometer, or the like, based on JIS Z 8803:2011.

The blending amount of component (a) is preferably 55% by volume or more from the viewpoint of durability and 65% by volume or less from the viewpoint of heat transfer, based on the liquid silicone rubber mixture used to form the elastic layer 20_c_.

Component (b)

The organopolysiloxane having active hydrogen bonded with silicon functions as a cross-linking agent that reacts with the unsaturated aliphatic group of component (a) under the action of a catalyst to form a cured silicone rubber.

Any organopolysiloxane having a Si—H bond can be used as the component (b). In particular, from the viewpoint of reactivity with the unsaturated aliphatic group of component (a), an organopolysiloxane having an average number of silicon-bonded hydrogen atoms of 3 or more per molecule is preferably used.

Specific examples of component (b) include linear organopolysiloxane represented by formula (3) below and cyclic organopolysiloxane represented by formula (4) below.

(3)

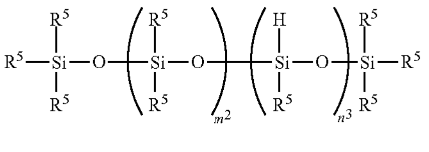

In formula (3), $m^2$ represents an integer of 0 or more, $n^3$ represents an integer of 3 or more, and $R^5$ each independently represents a monovalent unsubstituted or substituted hydrocarbon group containing no unsaturated aliphatic group.

(4)

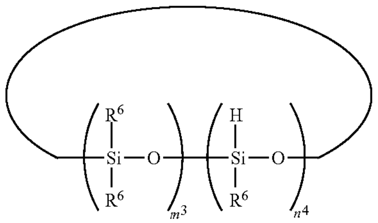

In formula (4), $m^3$ represents an integer of 0 or more, $n^4$ represents an integer of 3 or more, and $R^6$ each independently represents a monovalent unsubstituted or substituted hydrocarbon group containing no unsaturated aliphatic group.

Examples of monovalent unsubstituted or substituted hydrocarbon groups containing no unsaturated aliphatic group that can be represented by $R^5$ and $R^6$ in formulas (3) and (4) include the same groups as those mentioned above for $R^1$ in structural formula (1). Among these, it is preferable that 50% or more of each of $R^5$ and $R^6$ be a methyl group and more preferably all $R^5$ and $R^6$ are methyl groups because synthesis and handling are easy and excellent heat resistance is easily obtained.

Component (c)

Examples of the catalyst used to form the silicone rubber include a hydrosilylation catalyst for accelerating the curing reaction. Known substances such as platinum compounds and rhodium compounds can be used as hydrosilylation catalysts.

The blending amount of the catalyst can be appropriately set and is not particularly limited.

Component (d)

The elastic layer 41*c* may include a filler. The filler is to be added for controlling the thermal conductivity, the heat resistance, and the modulus of elasticity. As the thermally conductive filler, mention may be made of a metal, a metal compound, or a carbon fiber. A highly thermally conductive filler is further preferable, and specific examples thereof may include the following materials.

Metal silicon (Si), silicon carbide (SiC), silicon nitride ($Si_3N_4$), boron nitride (BN), aluminum nitride (AlN), alumina ($Al_2O_3$), iron oxide ($Fe_2O_3$), zinc oxide (ZnO), magnesium oxide (MgO), titanium oxide ($TiO_2$), silica ($SiO_2$), copper (Cu), aluminum (Al), silver (Ag), iron (Fe), nickel (Ni), carbon black (C), a carbon nanotube (C), a gas phase growth method carbon fiber, a PAN type (polyacrylonitrile) carbon fiber, and a pitch type carbon fiber.

The elastic layer may contain a reaction control agent (inhibitor). By including a reaction control agent, the reaction start time can be controlled. The reaction control agent is not particularly limited, and a known substance may be used. Examples thereof may include methylvinyltetrasiloxane, acetylene alcohols, siloxane-modified acetylene alcohol, and hydroperoxide.

(3) Resin Layer

The resin layer 41*b* is preferably a layer capable of bonding the surface layer and the elastic layer, and, for example, the resin layer 41*b* preferably comprises a cured product of an adhesive. That is, the resin layer is preferably an adhesive layer. The adhesive may be a solution-type adhesive or a hot melt adhesive.

The adhesive is not particularly limited, and known adhesives may be used. It is preferred to use a silicone rubber adhesive, and more preferred to use an addition-curable silicone rubber adhesive. When the elastic layer contains a silicone rubber, the elastic layer also contains an uncrosslinked component. In this case, the inner surface of the surface layer and an uncrosslinked component in the elastic layer are reacted with an uncrosslinked component in the adhesive and linked to each other by heating, whereby the surface layer and the elastic layer can be firmly adhered.

Examples of addition-curable silicone rubber adhesives may include those having at least one functional group selected from a vinyl group, a SiH group, and an epoxy group. When the addition-curable silicone rubber adhesive has a vinyl group, the vinyl group reacts with a SiH group, which is an uncrosslinked component that can be included in the elastic layer. When the addition-curable silicone rubber adhesive has a SiH group, the SiH group reacts with a vinyl group, which is an uncrosslinked component that can be included in the elastic layer. When the addition-curable silicone rubber adhesive has an epoxy group, the ring of the epoxy group opens to form an OH group, and the OH group forms a hydrogen bond with an OH group that can be included in the inner surface of the surface layer.

Specifically, SE 1819 CV manufactured by Dow Corning Toray Co., Ltd., in which equal amounts of "liquid A" and "liquid B" are mixed, may be mentioned.

(4) Surface Layer

The surface layer 41*a* contains a tetrafluoroethylene-perfluoroalkyl vinyl ether copolymer (PFA), which is a fluororesin. A PFA is a copolymer of perfluoroalkyl vinyl ether (PAVE) and tetrafluoroethylene (TFE). The PFA is not particularly limited, and those that have been known may be used. The copolymerization ratio (molar ratio) (PAVE/TFE) between perfluoroalkyl vinyl ether (PAVE) and tetrafluoroethylene (TFE) is preferably from 99.5/0.5 to 95.0/5.0 and more preferably from 99.0/1.0 to 95.5/4.5. Commercially available PFAs may be used as the PFA. Specifically, AP-230 (trade name, manufactured by Daikin Industries, Ltd.), AP-231SH (trade name, manufactured by Daikin Industries, Ltd.), which is a PFA with fully fluorinated terminal groups, and the like, may be mentioned.

The presence of PFAs can be confirmed, for example, by checking the presence of characteristic peaks of polytetrafluoroethylene (PTFE) and also checking a small peak around 994 $cm^{-1}$, which does not appear in PTFE, in the ATR spectrum of FT-IR. First, characteristic peaks of PTFE include peaks at 1200 $cm^{-1}$ ($CF_2$ antisymmetric stretching), at 1150 $cm^{-1}$ ($CF_2$ symmetric stretching), at 640 $cm^{-1}$ ($CF_2$ out-of-plane bending angle (wagging)), at 555 $cm^{-1}$ ($CF_2$ in-plane bending angle (scissoring)), and at 505 $cm^{-1}$ ($CF_2$ in-plane bending angle (rocking)). The position of the peak around 994 $cm^{-1}$, which is characteristic of a PFA, changes depending on the length of the carbon chain in the perfluoroalkyl vinyl ether moiety. The peak appears at 994 $cm^{-1}$ in the case of a perfluoropropoxy group, at 1090 $cm^{-1}$ in the case of a perfluoroethoxy group, and at 881 $cm^{-1}$ in the case of a perfluoromethoxy group.

As means for forming the surface layer 41*a* that contains a PFA, a method including coating a dispersion (a water-based dispersion paint) or a powder paint containing a PFA as a main component on the surface of the elastic layer 41*c* and heating this at a temperature of not lower than the melting point to form a film may be mentioned. Alternatively, a method including coating a PFA tube separately produced by extrusion molding on the surface of the elastic layer 41*c* may also be mentioned. For example, the surface layer 41*a* is a PFA tube.

In an endothermic curve measured at a ramp rate of 20° C./min by a differential scanning calorimeter (DSC), using a sample sampled from the surface layer 41*a* as a measurement sample, an endothermic quantity in a temperature rising process is 21 J/g or more.

Generally, a temperature rising process in the DSC measurement using a sampled sample as a measurement sample may be performed two or more times according to the purpose of the measurement. If the endothermic quantity in the first temperature rising process is 21 J/g in the case of performing temperature rising processes two or more times, the condition "the endothermic quantity in the temperature rising process is 21 J/g or more" is considered satisfied. Accordingly, the "endothermic quantity in the temperature rising process" may be referred to as the "endothermic quantity in the first temperature rising process".

The endothermic quantity in the temperature rising process of the DSC measurement is an endothermic quantity due to the crystal melting of a PFA. The degree of crystallinity of a PFA can be calculated by dividing the value of the endothermic quantity by the perfect crystal heat of fusion of the PFA (92.9 J/g). When the endothermic quantity is 21 J/g or more, the wear resistance against paper becomes good. When the endothermic quantity is 24 J/g or more, the wear resistance against paper becomes better.

The upper limit of the endothermic quantity is not particularly limited, but the endothermic quantity is preferably 40 J/g or less and particularly preferably 27 J/g or less. When the endothermic quantity is 40 J/g or less, a certain amount of amorphous moieties of a PFA is present in the surface layer, and it becomes easier to make the surface layer better follow the deformation of the elastic layer. The endothermic quantity in the temperature rising process is preferably from 21 to 40 J/g, more preferably from 21 to 27 J/g, and further preferably from 25 to 27 J/g.

The measurement of differential scanning calorimetry (DSC) and the analysis of the DSC chart in the present disclosure follows the Japanese Industrial Standards (JIS) K 7121-2012 unless otherwise noted.

As a method for making the endothermic quantity 21 J/g or more, a method including heating the surface layer 41*a* after formation to a temperature not lower than the melting temperature of a PFA and controlling the cooling rate to facilitate the crystallization of the PFA in the production process of the fixing member.

Specific methods are not particularly limited, but the following methods for heat-treating a surface layer can be used.

After the formation of the surface layer, an upright cylindrical heating tube that can be heated to, for example, 330° C. or higher is used in order to heat the entire area of the fixing film. For example, a band heater with a thermocouple is installed in the heating tube, thereby controlling the heating temperature of a fixing film. The heating temperature is preferably from the melting temperature of the PFA to 350° C. The heating time may be any time as long as the temperature of the surface layer sufficiently reaches the desired temperature and may be, for example, from 1 to 20 minutes, from 1 to 10 minutes, from 2 to 5 minutes, and the like.

After the completion of heating, the cooling rate of the heating tube is controlled to control the cooling rate of the fixing member. For example, if an air supply nozzle is formed on the outer circumference of the heating tube and the air flow rate is adjusted, the cooling rate can be controlled. The slower the cooling rate in the crystallization temperature range of a PFA, the more the crystallization of the PFA can be facilitated, and the cooling rate is preferably adjusted so that the endothermic quantity be 21 J/g or more. The cooling rate is preferably controlled until the temperature of the surface layer falls below the crystallization temperature range of the PFA. The cooling rate may be any rate within a range that can control the endothermic quantity to 21 J/g or more and is not particularly limited, but may preferably be from 5° C./min to 60° C./min, and more preferably from 10° C./min to 30° C./min.

In the surface layer 41*a*, the degree of orientation of molecules of the PFA to the direction orthogonal to the circumferential direction of the surface layer, obtained using a transmission X-ray diffraction method, is preferably 35% or less, particularly preferably 34% or less, and further particularly 25% or less. When the degree of orientation is 35% or less, the degree of orientation of the molecules of the PFA in the direction orthogonal to the circumferential direction of the fixing film is small. Therefore, even if fluorinated oil is adhered, the penetration of fluorinated oil in the direction orthogonal to the circumferential direction of the fixing film can be more reliably suppressed. As a result, the occurrence of chemical cracks along the direction can be prevented over a long period of time. The lower limit of the degree of orientation is not particularly limited but may be 0%, for example. The preferred range of the degree of orientation is, for example, from 0% to 35%, particularly from 0% to 34%, and still more preferably from 0% to 25%.

The degree of orientation of the surface layer can be adjusted by the condition for cylinder molding of a fluororesin. The method for measuring the degree of orientation will be described later.

The surface layer 41*a* comprises a plurality of spherulites of PFA. When the surface layer 41*a* comprises a plurality of spherulites of PFA, the size of the spherulite is small, and fluorinated oil impregnation is reduced. Therefore, chemical cracks are less likely to occur, and the durability against chemical cracks is good. As a method for including a plurality of spherulites of PFA in the surface layer 41*a*, for example, a method for heat-treating the surface layer may be mentioned.

The existence of spherulites of PFA can be confirmed by the method described below.

The number of spherulites of PFA is not particularly limited as long as it is plural, and, for example, may be from 2 to 300 per 500 $\mu m^2$. When the number is within the above range, the durability against chemical cracks tends to be good.

The number of the spherulites of PFA is determined by observation using a transmission polarizing microscope, followed by counting the number of spherulites in an area of 500 $\mu m^2$.

The thickness of the surface layer 41*a* is preferably 100 μm or less. The thickness of the surface layer is more preferably from 10 to 100 μm, further preferably from 10 to 70 μm, and particularly preferably from 15 to 50 μm. When the thickness is within the above range, the wear resistance is increased.

The thickness of the surface layer 41*a* can be measured by a micrometer.

As a method for adjusting the thickness to be within the above range, for example, the following method can be employed. Here, an example in which a PFA tube is used for producing the surface layer 41*a* is mentioned, but the surface layer of the present disclosure is not limited to those formed using a PFA tube.

For example, the PFA tube is produced by extruding molten PFA for a cylindrical die. Such a PFA tube is cooled rapidly during the extrusion process, and crystallization progresses rapidly. Thus, crystals are orientated in the extrusion direction, and the degree of crystallinity is low. The PFA tube is placed as a surface layer 41*a* to cover the surface of the elastic layer 41*c*, and the surface layer is then heat-treated, whereby the degree of crystallinity is increased, and spherulites are formed on the surface of the surface layer. By increasing the degree of crystallinity, the endothermic quantity in the first temperature rising process can be easily controlled to be within the range described above.

Furthermore, the heat treatment also relaxes the molecular orientation of the PFA tube, and the molecular chains that were oriented in the extrusion direction become random. The thermal conductivity in the thickness direction can be increased in this way. At this time, the degree of orientation of the PFA tube obtained using a transmission X-ray diffraction method is 35% or less.

When the inner surface of the surface layer 41*a* is subjected to sodium treatment, excimer laser treatment, ammonia treatment, or plasma etching treatment, adhesion can be increased. It is preferred to treat the inner surface of the PFA tube using excimer laser treatment.

As the excimer laser treatment, it is preferred to allow a compound that absorbs ultraviolet light to adhere to the inner surface of the PFA tube and irradiate the compound with UV laser light such as KrF excimer laser light or ArF excimer laser light. As the compound that absorbs UV light, a known compound may be used. For example, an aqueous solution containing a mixture of a compound that absorbs UV light, such as sodium benzoate, and a known fluorochemical surfactant is prepared, and the solution is then applied to the inner surface of the PFA tube and air-dried.

The irradiation condition of excimer laser light is normally selected from the viewpoint of improvement in wettability and adhesive properties, and the irradiation amount per shot or the number of shots is adjusted. In the present disclosure, it is preferred to sufficiently progress the carbonization on the inner surface of the PFA tube by increasing the number of shots than would normally be required. For example, the irradiation amount of the excimer laser light is preferably from 100 to 600 $mJ/cm^2$/pulse and more preferably from 200 to 400 $mJ/cm^2$/pulse. The number of shots is preferably from 3 to 10 and more preferably from 4 to 8.

The measurement method for each property in the present disclosure is described below.

Method for Measuring Endothermic Quantity

First, a surface layer is isolated from a fixing film. Specifically, a laminate of the elastic layer and the surface layer is peeled off from the substrate. The peeled laminate of the elastic layer and the surface layer is immersed in e-Solve 21RS (manufactured by Kaneko Chemical Co., Ltd.), then is put in a water tank of an ultrasonic cleaner (trade name: Bransonic (model: 2510J-DTH); manufactured by Emerson Japan, Ltd.), and ultrasonic waves are applied to the laminate for 60 minutes to dissolve the elastic layer.

After that, the laminate is taken out, washed with water, and wiped with toluene and then with ethanol to isolate only the surface layer. All isolated surface layers were used as a sample.

The endothermic quantity is measured using a differential scanning calorimeter (trade name: Q2000, manufactured by TA Instruments). The melting points of indium and zinc are used for correcting the temperature of the device detection unit, and the heat of fusion of indium is used for correcting the amount of heat. Specifically, 4 mg of the surface layer isolated as above is weighted precisely and put in an aluminum pan.

An empty aluminum pan is used as a reference. The measurement is performed within the measurement range from 25° C. to 400° C. and at a ramp rate of 20° C./min. The temperature is raised to 400° C. and kept at the same temperature for 5 minutes, and then the temperature is lowered to 25° C. at a ramp down rate of 20° C./min. At this time, the area surrounded by a temperature-endothermic quantity curve including an endothermic peak and the baseline is taken as the endothermic quantity.

Method for Measuring Number of Spherulites

First, a surface layer is isolated from a fixing film as described above. Then, the outer surface of the isolated surface layer is observed by a polarized optical microscope (ECLIPSE LV100N POL (manufactured by NIKON Corporation)), thereby obtaining an observed image of spherulites. As the condition for observation, a fluororesin taken out as a sample is observed using a polarized optical microscope with 5× and 20× objective lenses. An observation image that can check the spherulite structure can be obtained using the transmission polarizing microscope. From the observed image of spherulites thus obtained, the number of spherulites is checked, and it can be thus confirmed that the surface layer comprises a plurality of spherulites of PFA.

Orientation Measurement of Surface Layer

First, the surface layer is isolated from an electrophotographic image member. Specifically, a razor is inserted between the elastic layer and the base layer, and a laminate of the elastic layer and the surface layer is peeled off from the substrate. The peeled laminate of the elastic layer and the surface layer is immersed in e-Solve 21RS (manufactured by Kaneko Chemical Co., Ltd.), then the laminate is put in a water tank of an ultrasonic cleaner (trade name: Bransonic (model: 2510J-DTH); manufactured by Emerson Japan, Ltd.), and ultrasonic waves are applied to the laminate for 60 minutes to dissolve the elastic layer.

After that, the laminate is taken out, washed with water, and wiped with toluene and then with ethanol to isolate only the surface layer. The degree of orientation of the surface layer is obtained by calculating the degree of orientation by the wide-angle X-ray diffraction method. An orientated sample has a strength distribution along a Debye ring, and an X-ray diffraction image is used for measuring the degree of orientation. By using a fiber sample stand, 2θ is set to a peak of around 18°, the sample is rotated 360° (β-rotation), and the strength distribution is measured along the Debye ring. From the obtained strength distribution, the degree of orientation of the surface layer is obtained using the following formula.

$$H=\{(360-\Sigma W/360)\}\times 100$$

In the formula, H denotes the degree of orientation (%), and W denotes a half-width. The half-width means a half-width of the peak derived from two peaks originating from around 2θ=18°, one peak appearing at a β-rotation angle within a range from 0° to 180° and the other peak appearing at a β-rotation angle within a range from 180° to 360°.

A rotating anticathode-type X-ray diffraction device RINT 2500 (X-ray: CuKα) is used as an X-ray diffraction device, and measurement is performed at a tube voltage of 40 kV and a tube current of 15 mA.

Method for Measuring Thickness of Surface Layer

The thickness of the surface layer is measured using a high-precision digimatic micrometer (MDH-25MC, manufactured by Mitutoyo Corporation). The arithmetic average value of 5 measured points is used as the measurement result.

Evaluation Method

Next, evaluation methods in the present Examples are described.

Evaluation 1: Durability to Chemical Cracks

An evaluation is made using a prepared fixing apparatus. Evaluation conditions are as follows.

- Test environment: room temperature 10° C., humidity 10%
- Process speed: 280 mm/sec
- Printing speed: 60 prints/min
- Paper feeding condition: A lattice image is formed on GF-C104 (manufactured by Nippon Paper Industries Co., Ltd., 105 g paper, A4 size), and paper sheets are fed continuously.
- GC-C081 (manufactured by Nippon Paper Industries Co., Ltd., 68 g paper, A4 size) is fed for every 100,000 sheets fed, and the occurrence of the scratches in the longitudinal direction on the surface layer after feeding is observed, and an evaluation is made according to the following criteria.

Evaluation Criteria

- Rank A: No scratches occur even after 500,000 or more sheets have been fed
- Rank B: No scratches occur even after 400,000 or more sheets have been fed
- Rank C: No scratches occur even after 300,000 or more sheets have been fed
- Rank D: Scratches occur before less than 300,000 sheets are fed Evaluation 2: Durability Evaluation Evaluation of Wear Resistance An evaluation is made using a prepared fixing apparatus. Evaluation conditions are as follows.

- Test environment: room temperature 25° C., humidity 50%
- Process speed: 280 mm/sec
- Printing speed: 60 prints/min
- Paper feeding condition: A lattice image is formed on CS-068 (manufactured by Nippon Paper Industries Co., Ltd., 68 g paper, A4 size), and paper sheets are fed continuously.

Evaluation Criteria

- A: Almost no shaving is observed on the surface layer even after 500,000 sheets have been fed
- B: Almost no shaving is observed on the surface layer even after 200,000 sheets have been fed, but slight shaving caused by the edges of paper sheets is observed on the surface layer after 500,000 sheets have been fed
- C: Slight shaving is observed on the surface layer after 200,000 sheets have been fed, and clear shaving caused by the edges of paper sheets is observed on the surface layer after 500,000 sheets have been fed
- D: Clear shaving is observed on the surface layer after 200,000 sheets have been fed Evaluation of Motor Torque Current Value In addition to the evaluation on wear resistance described above, motor torque current values during paper feeding are measured for every 100,000 sheets fed, and evaluation is made under the following evaluation criteria. An excellent evaluation of a motor toque current value means that the heat resistance of the grease is excellent.

Evaluation Criteria

- Rank A: Motor torque is less than 2.0 A
- Rank B: Motor torque is 2.0 A or more and less than 2.5 A
- Rank C: Motor torque is 2.5 A or more and less than 3.0 A
- Rank D: Motor torque is 3.0 A or more

EXAMPLES

Hereinafter, the present disclosure is explained in further detail using Examples and Comparative Examples, but the aspects of the present disclosure are not limited to these.

Example 1

Method for Producing Fixing Film

In the present Examples, the fixing film as illustrated in FIG. 3 was prepared.

Inner Surface Treatment of PFA Tube

A PFA tube with a thickness of 20 μm obtained by extrusion molding using NEOFLON PFA: AP-231SH (manufactured by DAIKIN Industries) as a raw material was used. An aqueous solution, which had been prepared such that sodium benzoate should be 5% by mass and Surflon S-113 (a fluorochemical surfactant, manufactured by AGC Seimi Chemical Co., Ltd.) should be 1% by mass, was applied to the entire surface of a PFA tube and air-dried, and six shots of KrF excimer laser light with 300 $mJ/cm^2$/pulse were applied to obtain a PFA tube with a treated inner surface.

Base Layer

SUS with an inner diameter of 24 mm and a thickness of 30 μm was used as a base layer.

Formation of Internal Surface Sliding Layer

First, substantially equimolar amounts of an aromatic tetracarboxylic dianhydride or a derivative thereof and an aromatic diamine were allowed to react with each other in an aprotic polar organic solvent to obtain a polyimide precursor solution. The resulting polyimide precursor solution was applied to the inner circumferential surface of the base layer by a ring coating method, then the solvent was dried in an electric furnace, and the coating was heated at a temperature from 260° C. to 400° C. for about one hour to form an inner-surface sliding layer. The thickness of the inner-surface sliding layer was 12 μm.

Formation of Primer Layer and Elastic Layer

To the base layer with the inner-surface sliding layer, the primer layer and the elastic layer were formed according to the following procedure.

A hydrosilyl silicone primer (DY39-051 A/B; manufactured by Dow Toray Co., Ltd.) was applied to the base layer, and the coating was heated at 200° C. for 5 minutes.

A liquid addition-curable silicone rubber mixture containing the following components (a) to (d) was applied to the primer layer at a thickness of 250 μm and then heat-cured at 200° C. for 30 minutes to form a silicone rubber elastic layer with a thickness of 250 μm.

Silicone Rubber Mixture

Component (a): linear chain type organopolysiloxane with an unsaturated aliphatic group Component (b): organopolysiloxane with an active hydrogen bonded to silicon Component (c): catalyst Component (d): heat-conductive filler First, as the component (a), 100 parts by mass of a silicone polymer with a vinyl group as unsaturated aliphatic groups only at both ends of the molecular chain and a methyl group as an unsubstituted hydrocarbon group not containing other unsaturated aliphatic groups was prepared. This silicone polymer (trade name DMS-V35, manufactured by Gelest Inc., viscosity: 5000 $mm^2/s$) is hereinafter referred to as "Vi".

Next, as the component (d), 370 parts by mass of alumina (trade name: Alunabeads CB-P10, manufactured by Showa Denko K.K.) was added to this Vi, set to a planetary centrifugal mixer (manufactured by Thinky Corporation, ARV-5000), and the mixture was stirred and mixed at 600 rpm for 2 minutes to obtain a mixture 1.

Next, a solution of 0.2 parts by mass of 1-ethynyl-1-cyclohexanol (manufactured by Tokyo Chemical Industry Co., Ltd.) as a cure retarder in the same mass of toluene was added to the mixture 1, whereby a mixture 2 was obtained.

Next, as the component (c), 0.1 parts by mass of a hydrosilylation catalyst (platinum catalyst: a mixture of platinum-1,3-divinyltetramethyldisiloxane, 1,3-divinyltetramethyldisiloxane, and 2-propanol) was added to the mixture 2, whereby a mixture 3 was obtained.

Furthermore, as the component (b), 1.1 parts by mass of a silicone polymer with a linear siloxane skeleton and a silicon-bonded active hydrogen group, which was present only in the side chains (trade name: HMS-301, manufactured by Gelest, Inc., viscosity: 30 $mm^2/s$, hereinafter referred to as "SiH") was weighed. This was added to the mixture 3, and the resulting mixture was thoroughly mixed to obtain a liquid addition-curable silicone rubber mixture.

Coating of Adhesive Layer

After the formation of an elastic layer, an adhesive (SE 1819 CV A/B; manufactured by Dow Toray Co., Ltd.) was coated on the elastic layer using a ring coat method so that the thickness should be 7 μm.

Formation of Surface Layer

After coating the adhesive, the PFA tube with a treated inner surface mentioned above was placed to cover the adhesive by a vacuum expansion covering method (vacuum expansion covering method) from the outside to make a surface layer.

Specifically, a PFA tube was suctioned under vacuum conditions on the inner surface of an outer tube with an inner diameter larger than the outer diameter of a workpiece after the formation of the elastic layer with an applied adhesive to expand the diameter of the tube, the workpiece was inserted thereinto, and the vacuum was released so that the PFA tube should cover the adhesive. Extra adhesive and air between the PFA tube and the elastic layer was wiped off with an O-ring or the like, and then the adhesive was cured and adhered with heating means such as an electric furnace, whereby a resin layer was formed. Specifically, a high-temperature electric furnace (perfect oven PHH-201M (manufactured by ESPEC Corp.)) was used to heat at 200° C. for 5 minutes. After that, both edges were cut to the desired length (350 mm).

Heating Treatment of Surface Layer

Both edges were cut to the desired length, then the tube was inserted into a heating tube with an inner diameter of φ42 mm, and the entire range was heat-treated with a band heater in the heating tube. The heating temperature was set to 330° C., and heat treatment was performed so that the entity temperature of the surface layer should be not lower than the melting temperature of a PFA.

The heating time was set to 3 minutes after the fixing film was fed into the heating tube as a time during which the entity temperature of the surface layer could sufficiently reach the desired heat treatment temperature. After the lapse of 3 minutes from the feeding, the heating tube was cooled to 200° C. at a cooling rate of 20° C./min. After that, the fixing film was taken out from the heating tube to an atmosphere at an normal temperature (25° C.), whereby a fixing film was obtained.

The physical properties of the resulting fixing films are listed in Table 1.

The fixing apparatus illustrated in FIG. 2 was prepared using the resulting fixing film. Here, fluorine grease (trade name: MOLYKOTE HP-300 grease; manufactured by DuPont de Nemours, Inc.) was applied to the inner surface of the base layer 41*d* to provide the fluorine grease (not illustrated) on the surface of the heating body 43 of the fixing apparatus. Here, the "MOLYKOTE HP-300 grease" is a mixture of fluorinated oil and PTFE particles as thickeners.

The following evaluation was made on the prepared fixing film and the fixing apparatus. Table 2 shows the results.

Measurement Method of Endothermic Quantity

First, a surface layer was isolated from a fixing film. Specifically, a laminate of the elastic layer and the surface layer was peeled off from the substrate. The peeled laminate of the elastic layer and the surface layer was immersed in a silicone solubilizer (trade name: e-Solve 21RS; manufactured by Kaneko Chemical Co., Ltd.), then was put in a water tank of an ultrasonic cleaner (trade name: Bransonic (model: 2510J-DTH); manufactured by Emerson Japan, Ltd.), and ultrasonic waves were applied to the laminate for 60 minutes to dissolve the elastic layer. After that, the laminate was taken out, washed with water, and wiped with toluene and then with ethanol to isolate only the surface layer. All isolated surface layers were used as a sample.

The endothermic quantity was measured using a differential scanning calorimeter (trade name: Q2000, manufactured by TA Instruments). The melting points of indium and zinc were used for correcting the temperature of the device detection unit, and the heat of fusion of indium was used for correcting the amount of heat. Specifically, 4 mg of the surface layer isolated as above was weighted precisely and put in an aluminum pan. An empty aluminum pan was used as a reference. The measurement was performed within the measurement range from 25° C. to 400° C. and at a ramp rate of 20° C./min. The temperature was raised to 400° C. and kept at the same temperature for 5 minutes, and then the temperature was lowered to 25° C. at a ramp down rate of 20° C./min. At this time, the area surrounded by a temperature-endothermic quantity curve including an endothermic peak and the baseline was taken as the endothermic quantity.

Method for Measuring Number of Spherulites

First, a surface layer was isolated from a fixing film as described above. Then, the outer surface of the isolated surface layer was observed by a polarized optical microscope (trade name: ECLIPSE LV100N POL (manufactured by NIKON Corporation)), whereby an observed image of spherulites was obtained. As the condition for observation, a fluororesin taken out as a sample was observed using a polarized optical microscope with 5× and 20× objective lenses. From the observed image thus obtained, the number of spherulites was checked, and it was confirmed that the surface layer contained a plurality of spherulites of PFA.

Orientation Measurement of Surface Layer

First, a surface layer was isolated from an electrophotographic image member. Specifically, a razor was inserted between the elastic layer and the base layer, and a laminate of the elastic layer and the surface layer was peeled off from the substrate. The peeled laminate of the elastic layer and the surface layer was immersed in a silicone solubilizer (trade name: e-Solve 21RS; manufactured by Kaneko Chemical Co., Ltd.), then the laminate was put in a water tank of an ultrasonic cleaner (trade name: Bransonic (model: 2510J-DTH); manufactured by Emerson Japan, Ltd.), and ultrasonic waves were applied to the laminate for 60 minutes to dissolve the elastic layer.

After that, the laminate was taken out, washed with water, and wiped with toluene and then with ethanol to isolate only the surface layer.

The degree of orientation of the surface layer was obtained by calculating the degree of orientation by the wide-angle X-ray diffraction method. An X-ray diffraction image was used for the measurement of the degree of orientation. By using a fiber sample stand, 2θ was set to a peak of around 18°, the sample was rotated 360° (β-rotation), and the strength distribution was measured along the Debye ring. From the obtained strength distribution, the degree of orientation of the surface layer was obtained using the following formula.

$$H=\{(360-\Sigma W/360)\}\times 100$$

In the formula, H denotes the degree of orientation (%), and W denotes a half-width. The half-width means a half-width of the peak derived from two peaks originating from around 20-18°, one peak appearing at a β-rotation angle within a range from 0° to 180° and the other peak appearing at a β-rotation angle within a range from 180° to 360°.

A rotating anticathode-type X-ray diffraction device RINT 2500 (X-ray: CuKα) was used as the X-ray diffraction device, and measurement was performed at a tube voltage of 40 kV and a tube current of 15 mA.

Method for Measuring Thickness of Surface Layer

The thickness of the surface layer was measured using a high-precision digimatic micrometer (MDH-25MC, manufactured by Mitutoyo Corporation), and the arithmetic mean value measured at 5 points was used for the measurement results.

Evaluation Method

Next, evaluation methods in the present Examples are described.

Evaluation 1: Durability to Chemical Cracks

An evaluation was made using a prepared fixing apparatus. The evaluation conditions were as follows.

Test environment: room temperature 10° C., humidity 10%

Process speed: 280 mm/sec

Printing speed: 60 prints/min

Paper feeding condition: A lattice image was formed on copy paper sheets (trade name: GF-C104, manufactured by Nippon Paper Industries Co., Ltd., 105 g paper, A4 size), and the paper sheets were fed continuously.

A copy paper sheet (trade name: GC-C081; manufactured by Nippon Paper Industries Co., Ltd., 68 g paper, A4 size) was fed for every 100,000 sheets fed, and the occurrence of the scratches (chemical cracks) in the longitudinal direction of the surface layer after feeding was observed, and an evaluation was made according to the following criteria.

Evaluation Criteria

Rank A: No occurrence of chemical cracks was observed on the surface layer even after 500,000 sheets were fed.

Rank B: The number of sheets that had been fed at the time when the occurrence of chemical cracks on the surface layer was first observed was 400,000 sheets or more and less than 500,000 sheets.

Rank C: The number of sheets that had been fed at the time when the occurrence of chemical cracks on the surface layer was first observed was 300,000 sheets or more and less than 400,000 sheets.

Rank D: The number of sheets that had been fed at the time when the occurrence of chemical cracks on the surface layer was first observed was less than 300,000 sheets.

Evaluation 2: Durability Evaluation

Evaluation of Wear Resistance

A wear resistance test was performed on the prepared fixing apparatus under the following conditions, and an evaluation was made according to the following criteria.

Condition

Test environment: room temperature 25° C., humidity 50%

Process speed: 280 mm/sec

Printing speed: 60 prints/min

Paper feeding condition: A lattice image was formed on copy paper sheets (trade name: CS-068, manufactured by Nippon Paper Industries Co., Ltd., 68 g paper, A4 size), and the paper sheets were fed continuously.

Evaluation Criteria

A: No wear was observed on the surface layer even after 500,000 sheets had been fed.

B: No wear was observed on the surface layer even after 200,000 sheets had been fed, but slight wear caused by the edges of paper sheets was observed on the surface layer after 500,000 sheets had been fed.

C: Slight wear caused by the edges of paper sheets was observed on the surface layer after 200,000 sheets had been fed. Furthermore, clear wear caused by the edges of paper sheets was observed on the surface layer after 500,000 sheets had been fed.

D: Clear wear caused by the edges of paper sheets was observed on the surface layer by the edges of paper sheets after 200,000 sheets had been fed.

Evaluation of Motor Torque Current Value

In addition to the evaluation on wear resistance described above, motor torque current values during paper feeding were measured for every 100,000 sheets fed, and evaluation was made under the following evaluation criteria. A small motor torque current value means that the heat resistance of the grease is excellent.

Evaluation Criteria

Rank A: Motor torque was less than 2.0 A

Rank B: Motor torque was 2.0 A or more and less than 2.5 A

Rank C: Motor torque was 2.5 A or more and less than 3.0 A

Rank D: Motor torque was 3.0 A or more

Example 2

A fixing film was obtained in the same manner as in Example 1, except that the cooling rate of the heating tube in the heating treatment of the surface layer was changed to a rate of 60° C./min. A fixing apparatus was prepared using the resulting fixing film.

Example 3

A fixing film was obtained in the same manner as in Example 1, except that the heating control temperature of the heating tube in the heating treatment of the surface layer was changed to 320° C. A fixing apparatus was prepared using the resulting fixing film.

Example 4

A fixing film was obtained in the same manner as in Example 1, except that the thickness of the surface layer was changed to 10 μm. A fixing apparatus was prepared using the resulting fixing film.

Example 5

A fixing film was obtained in the same manner as in Example 1, except that the thickness of the surface layer was changed to 100 μm. A fixing apparatus was prepared using the resulting fixing film.

Example 6

A fixing film was obtained in the same manner as in Example 1, except that the cooling rate of the heating tube in the heating treatment of the surface layer was changed to a rate of 10° C./min. A fixing apparatus was prepared using the resulting fixing film.

Example 7

A fixing film was obtained in the same manner as in Example 1, except that the thickness of the surface layer was changed to 5 μm. A fixing apparatus was prepared using the resulting fixing film.

Example 8

A fixing film was obtained in the same manner as in Example 1, except that the thickness of the surface layer was changed to 110 μm. A fixing apparatus was prepared using the resulting fixing film.

Example 9

A fixing film was obtained in the same manner as in Example 1, except that the thickness of the surface layer was changed to 5 μm. A fixing apparatus was prepared using the resulting fixing film.

Comparative Example 1

A fixing film was obtained in the same manner as in Example 1, except that the surface layer was not heat-treated. A fixing apparatus was prepared using the resulting fixing film.

Comparative Example 2

A fixing film was obtained in the same manner as in Example 1, except that the cooling rate of the heating tube in the heating treatment of the surface layer was changed to a rate of 70° C./min. A fixing apparatus was prepared using the resulting fixing film.

Comparative Example 3

A fixing apparatus was prepared in the same manner as in Example 1, except that a silicone grease (trade name: G-501; manufactured by Shin-Etsu Silicone Co., Ltd.) was used instead of the fluorine grease.

Comparative Example 4

A fixing film and a fixing apparatus were prepared in the same manner as in Example 1, except that "959 HP-PLUS" (trade name, manufactured by The Chemours Company) was used instead of "AP-231SH", and a silicone grease G-501 (manufactured by Shin-Etsu Silicone Co., Ltd.) was used instead of the fluorine grease, as the raw materials of the surface layer.

The results of Examples 1 to 9 and Comparative Examples 1 to 4 are summarized in Tables 1 and 2.

TABLE 1

| | Lubricant | Plural spherulites | Endothermic quantity | Degree of orientation (%) | Surface layer thickness |
|---|---|---|---|---|---|
| Example 1 | Fluorine grease | Observed | 27 J/g | 0 | 20 μm |
| Example 2 | Fluorine grease | Observed | 21 J/g | 0 | 20 μm |
| Example 3 | Fluorine grease | Observed | 27 J/g | 35 | 20 μm |
| Example 4 | Fluorine grease | Observed | 21 J/g | 0 | 10 μm |
| Example 5 | Fluorine grease | Observed | 27 J/g | 0 | 100 μm |
| Example 6 | Fluorine grease | Observed | 28 J/g | 0 | 20 μm |
| Example 7 | Fluorine grease | Observed | 27 J/g | 40 | 20 μm |
| Example 8 | Fluorine grease | Observed | 27 J/g | 0 | 5 μm |
| Example 9 | Fluorine grease | Observed | 21 J/g | 0 | 110 μm |
| Comparative Example 1 | Fluorine grease | Not observed | 27 J/g | 0 | 20 μm |
| Comparative Example 2 | Fluorine grease | Observed | 20 J/g | 0 | 20 μm |
| Comparative Example 3 | Silicone grease | Observed | 27 J/g | 0 | 20 μm |
| Comparative Example 4 | Silicone grease | Not observed | 20 J/g | 40 | 9 μm |

TABLE 2

| | Chemical cracks | Wear resistance | Motor torque |
|---|---|---|---|
| Example 1 | A | A | A |
| Example 2 | A | C | A |
| Example 3 | B | A | A |
| Example 4 | A | B | A |
| Example 5 | A | B | A |
| Example 6 | B | A | A |
| Example 7 | C | A | A |
| Example 8 | A | C | A |
| Example 9 | A | C | A |
| Comparative Example 1 | D | A | A |
| Comparative Example 2 | A | D | A |
| Comparative Example 3 | A | A | D |
| Comparative Example 4 | A | D | D |

The fixing apparatuses produced by the method disclosed in the present Examples could achieve both wear resistance and durability against chemical cracks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-104714, filed Jun. 27, 2023 which is hereby incorporated by reference herein in its entirety.

What is claimed is:

1. A fixing apparatus, comprising:

a fixing film having an endless shape, the fixing film comprising a base layer, an elastic layer and a surface layer in this order, the surface layer comprising a plurality of spherulites of tetrafluoroethylene-perfluoroalkyl vinyl ether copolymer (PFA);

a pressurizing member disposed to face the fixing film and configured to form a nip with the fixing film;

a heating member disposed inside of the fixing film, having a facing surface facing an inner circumferential surface of the fixing film, and configured to bias the fixing film against the pressurizing member; and a fluorine grease interposed between the inner circumferential surface and the facing surface, wherein in an endothermic curve measured at a ramp rate of 20° C./min by a differential scanning calorimeter (DSC), using a sample sampled from the surface layer as a measurement sample, an endothermic quantity in a first temperature rising process is 21 J/g or more, and a degree of orientation of molecules of the PFA to a direction orthogonal to a circumferential direction of the surface layer, obtained using a transmission X-ray diffraction method, is 35% or less.

2. The fixing apparatus according to claim 1, wherein the endothermic quantity in the first temperature rising process is 21 to 40 J/g.

3. The fixing apparatus according to claim 1, wherein the surface layer has a thickness within a range from 10 to 100 μm.

4. The fixing apparatus according to claim 1, wherein the fluorine grease comprises a fluororesin particle and a fluorinated oil.

5. An electrophotographic image forming apparatus comprising a fixing apparatus, the fixing apparatus comprising:

a fixing film having an endless shape, the fixing film comprising a base layer, an elastic layer and a surface layer in this order, the surface layer comprising a plurality of spherulites of tetrafluoroethylene-perfluoroalkyl vinyl ether copolymer (PFA);

a pressurizing member disposed to face the fixing film and configured to form a nip with the fixing film;

a heating member disposed inside of the fixing film, having a facing surface facing an inner circumferential surface of the fixing film, and configured to bias the fixing film against the pressurizing member; and a fluorine grease interposed between the inner circumferential surface and the facing surface, wherein in an endothermic curve measured at a ramp rate of 20° C./min by a differential scanning calorimeter (DSC), using a sample sampled from the surface layer as a measurement sample, an endothermic quantity in a first temperature rising process is 21 J/g or more, and a degree of orientation of molecules of the PFA to a direction orthogonal to a circumferential direction of the surface layer, obtained using a transmission X-ray diffraction method, is 35% or less.

* * * * *